United States Patent [19]

Broos et al.

[11] Patent Number: 5,418,259

[45] Date of Patent: May 23, 1995

[54] PROCESS FOR PREPARING POLYURETHANE ELASTOMER FROM A SOFT-SEGMENT ISOCYANATE-TERMINATED PREPOLYMER

[75] Inventors: Rene Broos, Bornem, Belgium; Frans Paap, Hillegom, Netherlands; Bruno Maccari, Carpi, Italy

[73] Assignees: The Dow Chemical Company, Midland, Mich.; Dow Italia S.p.A., Milan, Italy

[21] Appl. No.: 140,173

[22] PCT Filed: Jun. 11, 1992

[86] PCT No.: PCT/US92/04954

§ 371 Date: Jan. 27, 1994

§ 102(e) Date: Jan. 27, 1994

[87] PCT Pub. No.: WO92/22595

PCT Pub. Date: Dec. 23, 1992

[51] Int. Cl.⁶ .................................................. C08G 18/10
[52] U.S. Cl. ...................................... 521/159; 521/174; 528/60; 528/66
[58] Field of Search ................ 521/159, 174; 528/60, 528/66

[56] References Cited

U.S. PATENT DOCUMENTS

| | | | |
|---|---|---|---|
| 4,321,333 | 3/1982 | Alberino et al. | 521/159 |
| 4,377,645 | 3/1983 | Guthrie et al. | 521/137 |
| 4,532,316 | 7/1985 | Henn | 528/59 |
| 4,559,366 | 12/1985 | Hostettler | 521/51 |
| 4,771,083 | 9/1988 | Altounian | 521/159 |
| 4,906,720 | 3/1990 | Parfondry | 528/28 |

*Primary Examiner*—Maurice J. Welsh

[57] ABSTRACT

This invention relates to a process of preparing polyurethane polymers by reaction of an isocyanate composition having an isocyanate equivalent weight of from 180 to 300 and comprising in from at least 50 weight percent a prepolymer, with an active hydrogen-containing substance in the presence of water which provides for at least 50 mole percent of the total blowing requirement. The prepolymer is obtained by reacting a molar excess of a polyisocyanate comprising, in from at least 70 weight percent, 4,4'-methylene diphenylisocyanate with an isocyanate-reactive composition containing (a) a branched diol or triol having a molecular weight of from 60 to 300, and (b) a polyoxyalkylene polyol or mixtures thereof having an average functionality of from 2 to 4 and a molecular weight of from 3000 to 12000, wherein the parts by weight ratio of (a):(b) is from 0.01:1 to 0.25:1.

10 Claims, No Drawings

PROCESS FOR PREPARING POLYURETHANE ELASTOMER FROM A SOFT-SEGMENT ISOCYANATE-TERMINATED PREPOLYMER

This invention relates to a process for preparing a polyurethane elastomer from a "soft-segment" isocyanate-terminated prepolymer.

Elastomeric polyurethane polymer for applications such as, for example, shoe soles desirably exhibits good physical properties including especially abrasion resistance, flexibility and durability. Typically such polymer may be obtained by reaction of a polyester polyol with an isocyanate terminated polyester polyol-based prepolymer in the presence of water or alternatively by reaction of a polyether polyol with a "hard segment" isocyanate terminated polyether polyol-based prepolymer in the presence of a blowing agent consisting predominantly of a physical blowing agent such as, for example, trichlorofluoromethane. The preparation of polyurethane polymer by such procedures is described, for example, in patent publications E.P. 235,888; E.P. 175,733; U.S. Pat. No. 3,591,532; U.S. Pat. No. 3,901,959; U.S. Pat. No. 4,647,596 and U.S. Pat. No. 4,757,095.

Isocyanate-terminated prepolymers obtained from low molecular weight polyols or diols are frequently identified as a "hard-segment" prepolymers in contrast to "soft-segment" prepolymers generally obtained from high molecular weight polyols or diols. The terminology, "hard-" and "soft-segment", derives from the morphology of elastomeric polymers which can contain distinct phase separated regions. Such regions can be detected by thermoanalysis techniques and distinguished by, for example, glass transition temperatures. Generally, soft-segments of the polymer can be considered as having glass transition temperatures below room temperature whilst hard-segments can be considered as having glass transition temperatures above room temperature or even melting points if a crystallite. It is the current opinion and hence their classification that "soft-segment" prepolymers are associated with the formation of the soft-segment phase of the elastomer and conversely hard-segment prepolymers with the hard-segment phase of the elastomer. Structure-property relationships of hard- and soft-segment phases are described for example by Redman in "Developments in Polyurethanes-I" J. M. Buist Ed., Elsevier, London—published 1978. The distinction of the prepolymer type on basis of molecular weight of the polyol used in the preparation of the prepolymer is arbitrary but general such prepolymers obtained from diols or triols having an equivalent weight of about 150 or less are considered to be "hard-segment" prepolymers.

The use of "hard-segment" prepolymers when preparing polyether polyol-based polyurethane polymer, restricts and makes it difficult to substitute or eventually replace all of the physical blowing agent with, for example, water. If water is used as the principal blowing means, the physical properties of the resulting polymer and especially flexibility, abrasion resistance and hardness deteriorate. Additionally, processing becomes noticeably inferior with, for example, increased demold times of molded articles. Due to current environmental concern relating to the earths atmosphere and ozone levels it is highly desirable to substitute certain physical blowing agents with alternative blowing agents. Particularly, it is desirable to contemplate the use of water as an alternative blowing means. It is therefore desirable to develop a new process for the preparation of polyurethane polymers, particularly microcellular elastomeric polyurethane polymers, which allows for the use of water as principal blowing agent. To this purpose we have investigated the use of "soft-segment" prepolymers in the preparation of polyether polyol-based polyurethane polymers.

Use of "soft-segment" prepolymers in the preparation of polyurethane foam is known from patent publications such as, for example, E.P. 22,617 and E.P. 398,304; whilst use of "soft-segment" prepolymers in the preparation of elastomeric polyurethane polymers is disclosed in, for example, the patent publications U.S. Pat. No. 4,190,711; U.S. Pat. No. 4,532,316, U.S. Pat. No. 4,559,366 and U.S. Pat. No. 4,374,210. In U.S. Pat. No. 4,321,333 an isocyanate-terminated prepolymer obtained by reaction of a polyisocyanate with a polyol blend, containing from 15 to 70 weight percent of a polyol having a molecular weight of from at least 1000, and from 85 to 30 weight percent of a polyol having a molecular weight of from 115 to 300, is described. This amount of low molecular weight polyol eonfers "hard-segment" characteristics to the prepolymer. While such a prepolymer can be used to prepare elastomeric polyurethane polymers in the presence of water the resulting polymer does not exhibit sufficiently attractive physical properties to meet present commercial demands.

It is therefore desirable to develop alternative, or modified, types of "soft-segment" isocyanate-terminated prepolymer. It is further desirable that such "soft-segment" prepolymer can permit the use of water as principal blowing means and provide for resulting polymers with attractive processing and physical properties.

In a first aspect, this invention is a process for preparing a polyurethane polymer which has a density of from 100 to 1000 kilograms per cubic meter by intimately contacting under reaction conditions, in the presence of a blowing agent comprising water, an active hydrogen-containing substance with an isocyanate composition characterized in that the isocyanate composition has an isocyanate equivalent weight of from 180 to 300 and contains in from at least 50 weight percent an isocyanate-terminated prepolymer, wherein said prepolymer is obtained by reaction of an organic polyisocyanate comprising 4,4'-methylene diphenylisocyanate in from at least 70 percent by total weight of polyisocyanate with an isocyanate-reactive composition that comprises (a) a branched diol or triol which has a molecular weight of from 60 to 300, and (b) a polyoxyalkylene polyol or mixtures thereof which has an average functionality, based on that of its initiator, of from 2 to 4 isocyanate reactive hydrogen atoms per molecule and a molecular weight of from 3000 to 12000, wherein (a) and (b) are present in a parts by weight ratio of from 0.01:1 to 0.25:1, wherein the blowing agent comprises water in an amount sufficient to provide for at least 50 mole percent of the blowing requirement to give the polymer of said density and wherein the isocyanate composition is present in an amount to provide from 0.8 to 1,3 isocyanate groups per isocyanate reactive hydrogen atom of the polyether polyol and water present.

In a second aspect, this invention is a polyether polyurethane prepared according to the process of the first aspect.

In a third aspect, this invention is a two component polyurethane polymer forming system which comprises:

a) from 40 to 60 percent by total weight of the system of an isocyanate composition which has an isocyanate equivalent weight of from 180 to 300 wherein the isocyanate composition contains an isocyanate-terminated prepolymer in from at least 50 weight percent and wherein said prepolymer is obtained by reaction of an organic polyisocyanate comprising 4,4'-methylene diphenylisocyanate in from at least 70 weight percent by total weight of polyisocyanate with an isocyanate-reactive composition that comprises (i) a branched diol or triol which has a molecular weight of from 60 to 300, and (ii) a polyoxyalkylene polyol or mixtures thereof which has an average functionality, based on that of its initiator, of from 2 to 4 isocyanate reactive hydrogen atoms per molecule and a molecular weight of from 3000 to 12000; wherein (i) and (ii) are present in a parts by weight ratio of from 0.01:1 to 0.25:1; and b) from 60 to 40 percent by total weight of the system of an active hydrogen-containing substance comprising a polyether polyol or polyester polyol and from 0.04 to 2 parts water per 100 parts polyol.

Surprisingly, it has been found that use of such isocyanate composition comprising an isocyanate-terminated prepolymer when preparing microcellular polyurethane polymers permits the use of water as a blowing agent whilst still providing for polymers having desirable processing and physical properties.

For purpose of clarity in the following description of the invention, when the expression "polyoxyalkylene polyol" is used this relates to the isocyanate-terminated prepolymer and the preparation thereof; when the expression "polyether polyol" or "polyester polyol" is used this relates to the preparation of the polyurethane polymer. The terms, "polyoxyalkylene polyol" and "polyether polyol" are not mutually exclusive.

As already mentioned, this invention relates to a process of preparing a polyurethane polymer and more particularly a microcellular polyurethane polymer by intimately contacting under reaction conditions an isocyanate composition with an active hydrogen-containing substance comprising a polyether or polyester polyol in the presence of water. The isocyanate composition is present in an amount to provide from 0.8 to 1.3, preferably from 0.9 and more preferably from 0.95 and up to preferably 1.1, more preferably up to 1.05 isocyanate groups per isocyanate reactive hydrogen atom of the polyol and water present.

The isocyanate composition employed in the process to prepare the polyurethane polymer is characterized in that it has an isocyanate equivalent weight of from 180 to 300, preferably from 200 and preferably up to 280. The isocyanate composition comprises in from at least 50, preferably from at least 75, and more preferably from at least 80 percent by total weight of the isocyanate composition, an isocyanate-terminated prepolymer. When the isocyanate composition does not consists in its entirety of the prepolymer, the remaining part of the isocyanate composition may be one or more of the conventional polyisocyanates, or less preferably isocyanate-terminated prepolymers, used in the preparation of polyurethane polymers and having an isocyanate equivalent weight of from 80 to 150. Suitable additional conventional isocyanates include aliphatic or preferably aromatic polyisocyanates as described in, for example, U.S. Pat. Nos. 4,065,410; 3,401,180; 3,454,606; 3,152,162; 3,492,330; 3,001,973; 3,394,164 and 3,124,605. Exemplary of suitable conventional aromatic polyisocyanates include 2,4- and/or 2,6-toluene diisocyanate (TDI), and especially 2,4'- or 4,4'-methylene diphenylisocyanate (MDI), p-phenylene diisocyanate and polymethylenepolyphenyl polyisocyanates and mixtures thereof.

The isocyanate-terminated prepolymer component of the isocyanate composition is characterized in that it has an isocyanate equivalent weight of from 180 to 300, preferably from 200, more preferably from 210 and most preferably from 215, and preferably up to 280, and more preferably up to 255. Prepolymers having an isocyanate equivalent weight outside this range may not provide for desirable processing and resulting polymers with attractive physical properties when prepared in the presence of water.

The above described isocyanate-terminated prepolymer is obtained by intimately mixing under reaction conditions a molar excess of an organic polyisocyanate that comprises 4,4'-methylene diphenylisocyanate in from at least 70 weight percent with an isocyanate-reactive composition comprising (a) a branched diol or triol that has a molecular weight of from 60 to 300; and (b) a polyoxyalkylene polyol or mixtures thereof which has an average, based on that of its initiator, of from 2 to 4 isocyanate reactive hydrogen atoms per molecule and a molecular weight of from 3000 to 12000.

With respect to obtaining a storage stable prepolymer, it is advantageous to use components (a) and (b) in a parts by weight ratio of from 0.01:1 to 0.25:1, preferably from 0.05:1, and more preferably from 0.07:1, and preferably up to 0.20:1, and more preferably up to 0.15:1. The amount of organic polyisocyanate present for reacting with the isocyanate-reactive composition is such to provide the resulting prepolymer with an isocyanate equivalent weight as described above.

Preferably, the amount of 4,4'-methylene diphenylisocyanate present when preparing the prepolymer is from at least 90, more preferably from at least 92, and most preferably from at least 94 weight percent by total weight of polyisocyanate present. If a lower amount of 4,4'-methylene diphenylisocyanate is employed when preparing the prepolymer, the resulting prepolymer when used to prepare a polyurethane polymer may not provide for the desired physical properties of the polymer. The remaining portion of the polyisocyanate used in the preparation of the prepolymer, when not 4,4'-methylene diphenylisocyanate advantageously comprises modified methylene diphenylisocyanates including those containing carbodiimide groups, and crude polymeric polyisocyanates such as obtained from the phosgenation reaction of crude mixtures of methylene diphenylamine, or mixtures thereof, 2,2'-methylene diphenylisocyanate and especially 2,4'-methylene diphenylisocyanate.

Component (a), the branched diol or triol, of the isocyanate-reactive composition used to prepare the prepolymer has a molecular weight of preferably from 100 to 200. By "branched" it is understood that the backbone of the diol or triol molecule comprises at least one tertiary or quaternary center generally being a carbon atom. A tertiary carbon atom having attached to it no more than one hydrogen atom and a quaternary carbon atom having attached to it no hydrogen atom. Exemplary of suitable and preferred branched diols and triols for use in preparing the prepolymer include 1,2-dipropylene glycol, tripropylene glycol, trimethylolpropane, glycerine, mixtures thereof and low molecular weight adducts thereof obtained through reaction with an alkylene oxide, especially propylene oxide. Use of linear diols or triol having a similar molecular weight may not provide for acceptable storage stability properties of the prepolymer.

Component (b) of the isocyanate-reactive composition used to prepare the prepolymer, the polyoxyalkylene polyol preferably has an average molecular weight of from 4000, and up to 9000, more preferably up to 7000. Further, the polyoxyalkylene polyol preferably has an average functionality of from 2 to 3, more preferably from 2.25 to 3. Suitable polyoxyalkylene polyols for use in preparing the prepolymer are those derived from $C_{2-4}$ alkylene oxides and include poly(oxytetramethylene) polyols and particularly poly(oxypropylene)- and poly(oxypropyleneoxyethylene)-polyols. When the polyoxyalkylene polyol comprises oxyethylene units advantageously such polyol does not contain more than 50, and preferably not more than 35 weight percent oxyethylene units which may be as an internal and/or terminal block and/or randomly distributed within the polyoxyalkylene polyol. Use of a polyol having an oxyethylene content exceeding this amount to prepare the prepolymer is not desirable as, in some instances, when the resulting prepolymer is subsequently used in the manufacturing process of a polyurethane polymer undesirable hardness properties of the polymer may be obtained. Exemplary of suitable and preferred polyoxyalkylene polyols include those sold by The Dow Chemical Company sold under the trademark "VORANOL" and include products designated as, for example, VORANOL CP 4711, VORANOL CP 4702 and VORANOL CP 6001.

In the process of this invention the above described isocyanate composition comprising the prepolymer is reacted with a polyol comprising a polyether polyol and/or polyester polyol to provide the polyurethane polymer.

Suitable polyester polyols may, for instance, be produced from dicarboxylic acids, preferably aliphatic dicarboxylic acids, having 2 to 12 carbon atoms in the alkylene radical, and multifunctional alcohols, preferably diols. These acids include, for instance, aliphatic dicarboxylic acids such as glutaric acid, pimelic acid, suberic acid, azelaic acid, sebacic acid, undecanedioic acid, dodecanedioic acid, and preferably, succinic and adipic acids; cycloaliphatic dicarboxylic acids such as 1,3- and 1,4-cyclohexane dicarboxylic acid; and aromatic dicarboxylic acids such as phthalic acid and terephthalic acid. Examples of di- and multifunctional, particularly difunctional, alcohols are: ethylene glycol, diethylene glycol, propylene glycol, dipropylene glycol, 1,3-propanediol, 1,10-decanediol, glycerine, trimethylolpropane, and preferably, 1,4-butanediol, and 1,6-hexanediol. If trifunctional alcohols are used for the manufacture of the polyester polyols, their amount must be chosen in such a manner that the functionality is a maximum of 2.8, preferably 2 to 2.3. Preferred polyester polyols for use in this invention are those which have a hydroxyl equivalent weight of from 500 to 3000, more preferably from 500 to 2000, and functionalities of from 2 to 3, preferably from 2 to 2.5.

Suitable polyether polyols for reacting with the isocyanate composition include those having an average functionality of from 1.7 to 3.0 and an average hydroxyl equivalent weight of from 1000 to 3000. Preferably the average functionality of such polyether polyol is from 1.75 and up to 2.7, more preferably up to 2.5. Preferably the average hydroxyl equivalent weight of such polyether polyol is from 1500, and more preferably from 1700, and up to 2500, more preferably up to 2200. Optionally and advantageously such polyether polyol may also have a primary hydroxyl content of from at least 75, preferably from at least 80, and more preferably from at least 85 percent based on total hydroxyl content of the polyol. Typically, such polyether polyols may be obtained by reaction of an active hydrogen-containing initiator with a quantity of one or more alkylene oxides to give a product of desired hydroxyl nature and equivalent weight. Generally, such alkylene oxides are $C_{2-4}$ alkylene oxides and include 1,4-butylene oxide, 2,3-butylene oxide, and especially propylene oxide and ethylene oxide. Exemplary of suitable initiators bearing such active hydrogen atoms are polyols, polyether adducts of polyols, polyamines and other compounds having a plurality of active hydrogen atoms per molecule, such as are described in U.S. Pat. No. 4,500,422. Preferred initiators for use in preparing polyether polyols suitable for employment in the process of preparing the polyurethane polymer include ethylene glycol, propylene glycol, butylene glycol, glycerine, 1,1,1-trimethylolpropane, 1,1,1-trimethylolethane, α-methylglucoside, $C_{2-8}$ alkylene diamines such as, for example, ethylenediamine and hexamethylenediamine, and mixtures thereof. Especially preferred are the glycol initiators or alkoxylated adducts of such glycols.

Exemplary of commercially available and preferred polyether polyols for use in manufacturing a polyurethane polymer by the process of this invention are those polyether polyols identified by the trademark "VORANOL" and include products designated as VORANOL EP 1900 and VORANOL CP 6055, sold by The Dow Chemical Company.

In addition, to the polyols described hereinabove other suitable polyols which may be present in the process of preparing the polyurethane polymer include so-called polymer polyols based on polyether polyols such as described in U.S. Pat. No. 4,394,491. Among the useful polymer polyols are included dispersions of polymers, of especially vinyl monomers particularly styrene/acrylonitrile copolymers, in a continuous polyether polyol phase. Also useful are the so-called polyisocyanate polyaddition (PIPA) polyols (dispersions of polyurea-polyurethane particles in a polyol) and the polyurea dispersions in polyol such as, for example, PHD polyols. Copolymer polyols of the vinyl type are described in, for example, U.S. Pat. Nos. 4,390;645; 4,463,107; 4,148,840 and 4,574,137.

When preparing a polyurethane polymer according to the process of this invention optionally and advantageously the polyether or polyester polyol is used in admixture with a chain extending agent. The presence of a chain extending agent provides for desirable physical properties, especially hardness, of the resulting polymer. Typically polyurethane polymers prepared according to the process of this invention in the presence of a chain extending agent will have a Shore A Hardness of from 20A to 80A. More typically, the resulting polymer will have a Shore A Hardness of preferably from 35A, more preferably from 45A and preferably up to 75A, and more preferably up to 70A. To provide for polymers of such hardness the chain-extending agent advantageously is present in an amount of from 2 to 20 percent based on total weight of the polyether polyol and chain extending agent. Preferably the chain extending agent is present in from 5, more preferably from 8, and up to 15 and more preferably up to 13 weight percent.

The chain-extending agent is characterized in that it is an isocyanate-reactive substance, especially an organic difunctional isocyanate-reactive substance that has an equivalent weight of less than or equal to 150 and preferably less than or equal to 100. Representative of suitable chain-extending agents include polyhydric alcohols, aliphatic diamines including polyoxyalkylenediamines, aromatic diamines and mixtures thereof. Preferred chain extending agents are dihydroxyl compounds, especially glycols. Illustrative of suitable chain-extending agents include 1,2-ethanediol, 1,3-propanediol, 1,5-pentanediol, 1,6-hexanediol, 1,2-propanediol, 1,3-butanediol, 1,4-butanediol, 1,6-hexanediol, 1,4-cyclohexanediol, 1,4-cyclohexanedimethanol, ethylenediamine 1,4-butylenediamine and 1,6-hexamethylenediamine. Compounds such as ethoxylated hydroquinone can also be employed as a chain-extending agent. The above-mentioned chain extending agents can be used singularly or combined or in admixture with other compounds including diethylene glycol, dipropylene glycol, ethanolamine, and N-methyldiethanolamine, and N-ethyldiethanolamine, as well as adducts obtained by esterification of, aliphatic carboxylic acids with aliphatic diols or triols such as those exemplified above utilizing from 0.01 to 1.08 mole of acid per mole of diol/triol. While any of the chain extending agents exemplified above can be employed in the process of preparing the polyurethane polymer it is particularly preferred to used 1,4-butanediol, 1,6-hexanediol, neopentyl glycol, 1,4-cyclohexane diol, ethylene glycol, bishydroxyethoxybenzene, ethoxylated hydroquinone glycerine, and diethylene glycol either alone or in admixture. Especially preferred as chain-extending agent is 1,4-butanediol.

As mentioned hereinabove, the polyurethane polymer is prepared in the presence of a blowing agent comprising water. The blowing agent is present in an amount to provide a polymer having a density of typically from 100 to 1000 kilograms, preferably from about 250, more preferably from about 350, and up to about 850, more preferably up to about 700 kilograms per cubic meter. Water provides for at least 50, preferably for at least 75 mole percent and most preferably the entirety of the blowing requirement to provide polyurethane polymer of the desired density. Water reacts with isocyanate groups generating nascent carbon dioxide which then causes the polymer-forming reaction mass to expand and acquire a reduced density. The amount of water present is typically from 0.05 to 2, preferably from 0.1 to 1.5 and more preferably from 0.2 to 0.8 weight percent based on the total weight of the polyol and optional chain-extending agent present.

If necessary and for reasons of, for example, skin formation the blowing agent may also contain a minor mole amount of a physical blowing agent which is a low boiling point liquid. Generally such liquid is an inert organic compound that can vaporize under the influence of the reaction exotherm and typically has a boiling point of below 100° C. Exemplary of suitable organic compounds include halogenated hydrocarbons such as, for example, methylene chloride, trichlorofluoromethane, dichlorodifluoromethane, dichlorofluoromethane, dichlorotetrafluoroethane, 1,1,2-trichloro-1,2,2-trifluoroethane, 1,1,1-trichloroethane, 1,1,1-trichlorodifluoroethane and 1,1,1-trichlorofluoroethane. Mixtures of these low boiling liquids with each other and or with hydrocarbons such as, for example, pentane, or entrained gases such as air, nitrogen or carbon dioxide may be used. Hydrocarbons and entrained gases may also be present in the absence of above mentioned types of low boiling liquids. Typically, when present such physical blowing agents are used in an amount of from 0.1 to 10, preferably from 2 to 8 and more preferably from 2 to 6 weight percent by total weight of the polyol and optional chain-extending agent present.

When preparing the polyurethane polymer according to the invention, optionally but advantageously there are present additional additives including catalysts, surfactants, fillers, pigments, fire retardants, antioxidants, and antistatic agents. The use of such additives is well-known in the art and reference is made thereto for this purpose.

Suitable catalysts include the tertiary amine and organometallic compounds such as described in U.S. Pat. No. 4,495,081. When using an amine catalyst advantageously it is present in from 0.1 to 3, preferably from 0.1 to 1 and more preferably from 0.4 to 0.8 weight percent by total weight of polyol and optional chain extending agent. When the catalyst is an organometallic catalyst, advantageously it is present in from 0.001 to 0.2, preferably from 0.002 to 0.1 and more preferably from 0.01 to 0.05 weight percent by total weight of polyol and optional chain extending agent. Particularly useful catalysts include in the case of amine catalysts; triethylenediamine, bis(N,N-dimethylaminoethyl)ether and di(N,N-dimethylaminoethyl)amine and in the case of the organometallic catalysts; stannous octoate, dibutyltin dilaurate, and dibutyltin diacetate. Combinations of amine and organometallic catalysts advantageously may be employed.

Suitable surfactants include the diverse silicone surfactants, preferably those which are block copolymers of a polysiloxane and a polyoxyalkylene. Exemplary of such surfactants are the products DC-193 and Q4-3667 available from Dow Corning and Tegostab B4113 available from Goldschmidt. When present, the amount of surfactants advantageously employed is from 0.1 to 2, and preferably from 0.2 to 1.3 percent by total weight of the polyol and optional chain extending agent. Other suitable surfactants also include non-silicone containing surfactants, such as poly(alkyleneoxides).

Suitable pigments and fillers include for example calcium carbonate, graphite, carbon black, titanium dioxide, iron oxide, alumina trihydrate, wollastonite, prepared glass fibers dropped or continuous, polyesters and other polymeric fibers.

Suitable methods of intimately mixing the isocyanate composition with the polyether polyol include, for example, a one shot method according to the known reaction injection molding techniques such as described in, for example, "Polyurethanes Handbook" by Günter Oertel Hanser Publishes Munich ISBN 0-02-948920-2 (1985). Other suitable methods for preparing microcellular and elastomeric polyurethane polymers are described, for example, in U.S. Pat. Nos. 4,297,444; 4,218,543; 4,444,910; 4,530,941 and 4,269,945.

The polyurethane polymer prepared according to the process of this invention is preferably a microcellular polyurethane polymer. Such a polymer is typically prepared by intimately mixing the reaction components at room temperature or a slightly elevated temperature for a short period and then pouring the resulting mixture into an open mold, or injecting the resulting mixture into closed mold, which in either case is heated. The mixture on reacting out takes the shape of the mold to produce a polyurethane polymer of a predefined structure, which can then when sufficiently cured be removed from the mold with a minimum risk of incurring deformation greater than that permitted for its intended end application. Suitable conditions for promoting the curing of the polymer include a mold temperature of typically from 20° C. to 150° C., preferably from 35° C. to 75° C., and more preferably from 45° C. to 55° C. Such temperatures generally permit the sufficiently cured polymer to be removed from the mold typically in from 1 to 10 minutes and more typically from 1 to 5 minutes after intimately mixing the reactants. Optimum cure conditions will depend on the particular components including catalysts and quantities used in preparing the polymer and also the size and shape of the article manufactured.

The polyurethane polymer produced according to this invention is useful in the preparation of articles such as, for example, rollers, door seals, coatings, tires, wiper blades, gaskets, belts, and particularly shoe soles.

The following examples are provided to illustrate the invention but are not intended to limit the scope thereof. All parts and percentages are given by weight unless otherwise indicated.

Isocyanate-terminated prepolymers are prepared as described below and used to manufacture polyurethane polymers. The polyurethane polymers are prepared by intimately mixing the isocyanate composition comprising prepolymer with a polyol composition, using a low pressure dispenser unit operating under high shear mixing conditions, and pouring the resulting mixture into a mold, thermostated at 45° C., of dimensions 20×20×1 cm. The mixture is allowed to cure for a given period of time prior to demolding the resulting polyurethane polymer. The reported physical properties of the resulting microcellular polymers where reported are observed according to the following procedures; density-DIN 53420; hardness (Shore A)-DIN 53505; abrasion resistance-DIN 53516; tensile strength and elongation-DIN 53504; and flexural fatigue - DIN 53522.

Preparation of Isocyanate-terminated Prepolymer 1

A prepolymer that has an isocyanate equivalent weight of 217 is prepared according to the following procedure wherein the parts by weight ratio of branched diol to polyoxyalkylene polyol, reacting with the polyisocyanate, is 0.15:1.

To 3355 parts of a polyisocyanate consisting of 98 weight percent 4,4'-methylene diphenylisocyanate (4,4'-MDI) and 2 weight percent 2,4'-MDI, is added at a controlled rate while stirring 1570 parts of a composition consisting of dipropylene glycol(molecular weight 134) and a polyoxypropylene-oxyethylene glycerine-initiated polyol (molecular weight 4800; oxyethylene content 15 weight percent). The rate of addition is such to maintain a relatively constant reaction temperature of from 65° C. to 70° C. When addition of the composition is complete the resulting reaction mixture is stirred at a temperature of 80° C. for a further three hours to ensure completion of reaction giving the end product.

Preparation of Isocyanate-terminated Prepolymer 2

A prepolymer that has an isocyanate equivalent weight of 280 is prepared according to the general procedure as described for Prepolymer 1, but wherein the parts by weight weight ratio of branched diol to polyoxyalkylene polyol, reacting with the polyisocyanate, is 0.11:1.

To 1930 parts of a polyisocyanate consisting of 98 weight percent 4,4'-MDI and 2 weight percent 2,4'-MDI is added at a controlled rate while stirring 1442 parts of a composition consisting of dipropylene glycol and of a polyoxypropylene-oxyethylene glycerine-initiated polyol (molecular weight 3000; oxyethylene content 12 weight percent).

Preparation of Isocyanate-terminated Prepolymer 3

A prepolymer that has an isocyanate equivalent weight of 245 is prepared according to the general procedure as described for Prepolymer 1, but wherein the parts by weight weight ratio of branched diol to polyoxyalkylene polyol, reacting with the polyisocyanate, is 0.05:1.

To 2287 parts of a polyisocyanate consisting of 98 weight percent 4,4'-MDI and 2 weight percent 2,4'-MDI is added 1495 parts of a composition consisting of dipropylene glycol and a polyoxypropylene-oxyethylene glycerine-initiated polyol (molecular weight 3000; oxyethylene content 12 weight percent).

Preparation of Isocyanate-terminated Prepolymer 4

A prepolymer that has an isocyanate equivalent weight of 213 is prepared according to the general procedure as described for Prepolymer 1, but wherein the parts by weight weight ratio of branched diol to polyoxyalkylene polyol, reacting with the polyisocyanate, is 0.05:1. The isocyanate-reactive composition contains dipropylene glycol and a polyoxypropylene-oxyethylene glycerine-initiated polyol (molecular weight 4800; oxyethylene content 15 weight percent).

Preparation of Isocyanate-terminated Prepolymer 5

A prepolymer that has an isocyanate equivalent weight of 251 is prepared according to the general procedure as described for Prepolymer 1, but wherein the parts by weight weight ratio of branched diol to polyoxyalkylene polyol, reacting with the polyisocyanate, is 0.05:1. The isocyanate-reactive composition contains dipropylene glycol and a polyoxypropylene-oxyethylene glycerine-initiated polyol (molecular weight 4800; oxyethylene content 15 weight percent).

Preparation of Comparative Isocyanate-terminated Prepolymer A

A comparative prepolymer having an isocyanate equivalent weight of 245 is prepared according to the general procedure described for Prepolymer 1 but in the absence of a low molecular weight branched diol or triol.

To 2650 parts of a polyisocyanate consisting of 98 weight percent 4,4'-MDI and 2 weight percent 2,4'-MDI is added 2125 parts of a composition consisting entirely of a polyoxypropylene-oxyethylene glycerine-initiated polyol (molecular weight 5000; oxyethylene content 70 weight percent).

Preparation of Comparative Isocyanate-terminated Prepolymer B

A comparative prepolymer having an isocyanate equivalent weight of 279 is prepared according to the general procedure described for Prepolymer 1 but in the absence of a branched diol or triol.

To 1814 parts of a polyisocyanate consisting of 98 weight percent 4,4'-MDI and 2 weight percent 2,4'-MDI is added 1928 parts of a composition consisting entirely of a polyoxypropylene-oxyethylene glycerine-initiated polyol (molecular weight 5000; oxyethylene content 70 weight percent).

Preparation of Polyurethane Polymers 1 to 8 and Comparative Polymers A to D

The so obtained isocyanate-terminated prepolymers are used to prepare a polyurethane polymer where it constitutes 100 weight percent of the isocyanate composition to be reacted with polyether polyol. The polymer is prepared according to the formulation, parts by weight, as presented below. Physical properties of the resulting polymer are given in Table 1.

| | |
|---|---|
| 88 pbw | a 4000 molecular weight polyoxyethylene-oxypropylene diol (oxyethylene content 20%, primary hydroxyl content 94%) |
| 11 | 1,4-butandiol |
| 0.5 | triethylenediamine |
| 0.015 | dibutyltin dilaurate |
| 0.6 | Surfactant, Tegostab B-4113 supplied by Th. Goldschmidt |
| 0.4 | Water |

As clearly evidenced by the data presented in Table 1, it is to be seen that polyurethane polymers obtained by the process of this invention using the prepolymers specifically described herein generally exhibit similar or enhanced physical properties including increased hardness, tensile strength and elongation in combination with reduced abrasion loss relative to polymers obtained from a like system involving reaction of prepolymers having a similar isocyanate equivalent weight and obtained by reaction of polyisocyanate with a polyoxyalkylene polyol having a comparable molecular weight but in the absence of a branched diol or triol. Notable in this respect is the advantageous physical properties observed for Polymers 7 and 8 relative to Polymers A and B.

TABLE 1

| | Polymer 1 | Polymer 2 | Polymer 3 | Polymer 4 | Polymer 5 | Polymer 6 |
|---|---|---|---|---|---|---|
| Prepolymer type | 2 | 2 | 3 | 3 | 4 | 4 |
| (NCO eq. wt) | (280) | (280) | (245) | (245) | (213) | (213) |
| Isocyanate Reaction Index Minimum | 0.98 | 1.02 | 0.98 | 1.02 | 0.98 | 1.02 |
| Demolding time (minutes) | 3 | 3 | 3 | 3 | 3 | 3 |
| Density (kg/m$^3$) | 600 | 600 | 600 | 600 | 600 | 600 |
| Hardness (Shore A) | 43 | 42 | 55 | 56 | 59 | 61 |
| Abrasion loss (mg) | >700 | >800 | 350 | 300 | 400 | 380 |
| Tensile Strength (Mpa) | 3.0 | 2.7 | 3.7 | 3.7 | 4.3 | 4.4 |
| Elongation (%) | 280 | 260 | 280 | 270 | 370 | 370 |
| Flexural Resistance (mm crack growth/cycles at 20° C.) | | | | | | |
| 30000 cycles | 0 | 0 | 0 | 0.8 | 0 | 0 |
| 100000 cycles | 0 | / | 5 | / | 0 | 0 |

| | Polymer 7 | Polymer 8 | Polymer A* | Polymer B* | Polymer C* | Polymer D* |
|---|---|---|---|---|---|---|
| Prepolymer type | 5 | 5 | A* | A* | B* | B* |
| (NCO eq. wt) | (251) | (251) | (245) | (245) | (279) | (279) |
| Isocyanate Reaction Index Minimum | 0.98 | 1.02 | 0.98 | 1.02 | 0.98 | 1.02 |
| Demolding time (minutes) | 5 | 5 | 5 | 5 | 5 | 5 |
| Density (kg/m$^3$) | 600 | 600 | 600 | 600 | 600 | 600 |
| Hardness (Shore A) | 60 | 61 | 42 | 42 | 28 | 26 |
| Abrasion loss (mg) | 280 | 280 | 470 | 650 | >800 | >800 |
| Tensile Strength (Mpa) | 4.2 | 4.4 | 2.8 | 2.8 | 2.2 | 2.1 |
| Elongation (%) | 340 | 330 | 290 | 280 | 340 | 340 |
| Flexural Resistance (mm crack growth/cycles at 20° C.) | | | | | | |
| 30000 cycles | 0 | 0 | 0 | 0 | 0 | 0 |
| 100000 cycles | 0 | 0 | 2 | 1 | 0 | 0 |

*Not an example of this invention

Preparation of Isocyanate-terminated Prepolymer 6

A prepolymer that has an isocyanate equivalent weight of 222 is prepared according to the general procedure described for Prepolymer 1, but wherein the parts by weight ratio of branched diol to polyoxyalkylene polyol, reacting with the polyisocyanate, is 0.11:1.

To 3825 parts of a polyisocyanate consisting of 98 weight percent 4,4'-MDI and 2 weight percent 2,4'-MDI is added 2030 parts of a composition consisting of dipropylene glycol and a polyoxypropylene-oxyethylene glycerine-initiated polyol (molecular weight 6000; oxyethylene content 15 weight percent). The resulting isocyanate-terminated prepolymer is used to prepare a polyurethane polymer where it constitutes 100 weight percent of the isocyanate composition to be reacted with polyether polyol. The polymer is prepared according to the formulation presented below, parts by weight, and physical properties of the resulting polymer are given in Table 2.

| | |
|---|---|
| 90.2 | a 4000 molecular weight polyoxyethylene-oxypropylene diol (oxyethylene content 40%, primary hydroxyl content 94%) |
| 8.8 | 1,2-ethanediol |
| 0.5 | triethylenediamine |
| 0.016 | dibutyltin dilaurate |
| 0.6 | Surfactant, Tegostab B-4113 supplied by Th. Goldschmidt |
| 0.4 | Water |

TABLE 2

| | Polymer 9 | Polymer 10 |
|---|---|---|
| Isocyanate Reaction Index | 0.98 | 1.02 |
| Minimum Demolding time (minutes) | 9 | 9 |
| Density (kg/m$^3$) | 600 | 600 |
| Hardness (Shore A) | 59 | 60 |
| Abrasion loss (mg) | 380 | 280 |
| Tensile Strength (Mpa) | 4.2 | 4.2 |
| Elongation (%) | 380 | 360 |
| Flexural Resistance (mm crack growth/cycles at 20° C.) | | |
| 30000 cycles | 0 | 0 |
| 100000 cycles | 0 | 0 |

The advantages provided by this present invention can be better appreciated by considering the data presented in the Table 3 where formulations and physical properties for a polyurethane polymer obtained by reaction of a "hard-segment" prepolymer in the presence of an inert physical blowing agent, trichlorofluoromethane (R-11); a polyurethane polymer obtained by reaction of same "hard-segment" prepolymer in the presence of water as the only blowing means; and a polyurethane polymer obtained according to this invention using a modified "soft-segment" prepolymer, Prepolymer 7.

Preparation of Isocyanate-terminated Prepolymer 7

A prepolymer that has an isocyanate equivalent weight of 225 is prepared according to the general procedure described for Prepolymer 1, but wherein the parts by weight ratio of branched diol (dipropylene glycol) to polyoxyalkylene polyol (a polyoxypropylene-oxyethylene glycerine-initiated polyol molecular weight 4800; oxyethylene content 15 weight percent) reacting with the polyisocyanate, is 0.11:1. The resulting isocyanate-terminated prepolymer is used to prepare a polyurethane polymer where it constitutes 100 weight percent of the isocyanate composition to be reacted with polyether polyol. Polymer is prepared according to the formulation presented below, parts by weight, and physical properties of the resulting polymer are given in Table 3. Symbols and footnotes used in Table 3 indicate the following:

VORANATE M380—a "hard segment" isocyanate terminated prepolymer available from The Dow Chemical Company; obtained by reaction of 4,4'-methylene diphenylisocyanate with tripropylene glycol.

VORANOL EP 1900—a 4000 molecular weight polyoxypropylene-oxyethylene diol available from The Dow Chemical Company.

VORANOL CP 6001—a 6000 molecular weight polyoxypropylene-oxyethylene triol available from The Dow Chemical Company.

TABLE 3

| | E* | F* | 11 | 12 |
|---|---|---|---|---|
| VORANATE M380* | / | / | | |
| Prepolymer 7 | | | / | / |
| Isocyanate Reaction Index | 1.0 | 1.0 | 0.98 | 1.02 |
| VORANOL EP 1900 | 70 | 88 | 100 | 100 |
| VORANOL CP 6001 | 15.75 | 10.6 | / | / |
| Surfactant | 0.1① | 0.5② | 0.5② | 0.5② |
| R-11 | 5.7 | / | / | / |
| water | 0.15 | 0.45 | 0.45 | 0.45 |
| 1,4-butanediol | 6.52 | 9.9 | 9.9 | 9.9 |
| Triethylenediamine③ | 1.8 | 1.44 | 1.44 | 1.44 |
| Dibutyltin dilaurate | 0.02 | 0.02 | 0.02 | 0.02 |
| Demolding time (minutes) | 3 | >5 | 3 | 3 |
| Density (kg/m$^3$) | 600 | 600 | 600 | 600 |
| Hardness (Shore A) | 62 | 51 | 55 | 56 |
| Abrasion loss (mg) | 280 | 420 | 320 | 300 |
| Tensile Strength (Mpa) | 4.4 | 4.2 | 4.1 | 4.2 |
| Elongation (%) | 400 | 320 | 380 | 360 |
| Flexural Resistance (mm crack growth/cycles at 20° C.) | | | | |
| 30000 cycles | <1 | <1 | <1 | <1 |
| 100000 cycles | <1 | <1 | <1 | <1 |

*Not an example of this invention
①Surfactant DC193 available from Dow Corning
②Surfactant Tegostab B-4113 available from Th Goldschmidt
③As a 33 wt % solution in 1,4-butane diol

Preparation of Isocyanate-terminated Prepolymer 8

A prepolymer is prepared according to the general procedure described for Prepolymer 1. To 64 parts of a polyisocyanate consisting of 98 weight percent 4,4'-methylene diphenylisocyanate (4,4'-MDI) and 2 weight percent 2,4'-MDI, is added 36 parts of a composition consisting of about 12.2 weight percent dipropylene glycol(molecular weight 134) and about 87.8 weight percent of a polyoxypropylene-oxyethylene diol initiated polyol (molecular weight 4000; oxyethylene content 70 weight percent). The resulting isocyanate-terminated prepolymer is used to prepare a polyurethane polymer where it constitutes 100 weight percent of the isocyanate composition to be reacted with a polyester polyol, as reported in Table 4. A comparative polymer is prepared by reacting a polyester based prepolymer with the same polyol formulation. Symbols and footnotes used in Table 4 are as for those used in Table 3.

BESTER 41 a polyester polyol, functionality 2, of 2000 molecular weight supplied by Polychimica, Italy. Polyol is understood to be a polycondensation product of adipic acid with butandiol and ethylene glycol.

Comparative Prepolymer C: an isocyanate terminated prepolymer having same NCO content as Prepolymer 8 but obtained from reaction of same isocyanate with the BESTER 41 polyester polyol.

Polymers obtained according to this example and the invention show comparative physical properties to a polymer obtained from an all polyester system but with an enhanced flexural fatigue performance after humid aging.

TABLE 4

|   | PU Polymer from Prepolymer 8 | PU Polymer from Comparative polyester-based prepolymer C* |
|---|---|---|
| Isocyanate Reaction Index | 1.0 | 1.0 |
| BESTER 41 | 100 | 100 |
| ethylene glycol | 8.63 | 8.63 |
| Surfactant① | 0.15 | 0.15 |
| water | 0.06 | 0.06 |
| Triethylenediamine solution③ | 1.6 | 1.6 |
| Dibutyltin dilaurate | 0.02 | 0.02 |
| Demolding time (minutes) | 2.5 | / |
| Density (kg/m$^3$) | 500 | 500 |
| Hardness (Shore A) | 59 | 57 |
| Abrasion loss (mg) | 100 | 100 |
| Tensile Strength (Mpa) | 6.2 | 6.4 |
| Elongation (%) | 400 | 440 |
| Flexural Resistance (mm crack growth/cycles at 20° C.) | | |
| 30000 cycles | 2 | 2 |
| 30000 cycles after humid aging④ | 2 | 6 |

*Not an example of this invention
④Exposure of foam to a 95% relative humidity/70° C. for 7 days prior to testing

We claim:

1. A process for preparing a polyurethane polymer which has a density of from 100 to 1000 kilograms per cubic meter by intimately contacting under reaction conditions, in the presence of a blowing agent comprising water, an active hydrogen containing substance with an isocyanate composition characterized in that the isocyanate composition has an isocyanate equivalent weight of from 180 to 300 and comprises in from at least 50 weight percent an isocyanate-terminated prepolymer, wherein said prepolymer is obtained by reaction of an organic polyisocyanate comprising 4,4'-methylene diphenylisocyanate in from at least 70 percent by total weight of polyisocyanate with an isocyanate-reactive composition that comprises (a) a branched diol or triol which has a molecular weight of from 60 to 300, and (b) a polyoxyalkylene polyol or mixtures thereof which has an average functionality, based on that of its initiator, of from 2 to 4 isocyanate reactive hydrogen atoms per molecule and a molecular weight of from 3000 to 12000, wherein (a) and (b) are present in a parts by weight ratio of from 0.01:1 to 0.25:1, wherein the blowing agent comprises water in an amount sufficient to provide for at least 50 mole percent of the blowing requirement to give the polymer of said density and wherein the isocyanate composition is present in an amount to provide from 0.8 to 1,3 isocyanate groups per isocyanate reactive hydrogen atom of the polyether polyol and water present.

2. A process as claimed in claim 1 wherein the isocyanate prepolymer is obtained by reaction of the organic polyisocyanate with an isocyanate-reactive composition that comprises (a) a branched diol or triol has a molecular weight of from 100 to 200, and (b) a polyoxyalkylene polyol or mixtures thereof which has an average molecular weight of from 3000 to 9000.

3. A process as claimed in claims 1 or 2 wherein the parts by weight ratio of (a):(b) is from 0.05:1 to 0.15:1.

4. A process as claimed in claim 1 wherein the active hydrogen containing substance is a polyether polyol which has an average functionality of from 1.7 to 3.0; an average hydroxyl equivalent weight of from 1000 to 3000.

5. A process as claimed in claim 1 wherein the active hydrogen containing substance is a polyester polyol that has an average functionality of from 2 to 3 and an average hydroxyl equivalent weight of from 500 to 2000.

6. A process as claimed in claims 4 or 5 wherein the polyol is in admixture with a chain-extending agent which is present in an amount of from 2 to 20 weight percent based on the total weight of the polyol including chain extending agent.

7. A process as claimed in claim 1 wherein the isocyanate-terminated prepolymer is obtained by reaction of an organic polyisocyanate comprising 4,4'-methylene diphenylisocyanate in from at least 90 percent by total weight of polyisocyanate.

8. A process as claimed in claim 7 wherein said isocyanate composition comprises said prepolymer in from at least 80 weight percent and wherein the isocyanate composition is present in an amount to provide from 0.9 to 1.1 isocyanate groups per isocyanate-reactive hydrogen atom of the polyol and water present.

9. A polyurethane polymer prepared by the process of any one of the preceding claims.

10. A two component polyurethane polymer forming system which comprises:

a) from 40 to 60 percent by total weight of the system of an isocyanate composition which has an isocyanate equivalent weight of from 180 to 300 wherein the isocyanate composition comprises an isocyanate-terminated prepolymer in from at least 50 weight percent and wherein said prepolymer is obtained by reaction of an organic polyisocyanate comprising 4,4'-methylene diphenylisocyanate in from at least 70 weight percent by total weight of polyisocyanate with an isocyanate-reactive composition that comprises (i) a branched diol or triol which has a molecular weight of from 60 to 300, and (ii) a polyoxyalkylene polyol or mixtures thereof which has an average functionality, based on that of its initiator, of from 2 to 4 isocyanate-reactive hydrogen atoms per molecule and a molecular weight of from 3000 to 12000; wherein (i) and (ii) are present in a parts by weight ratio of from 0.01:1 to 0.25:1; and b) from 60 to 40 percent by total weight of the system of a polyol composition containing a polyether polyol or polyester polyol and from 0.04 to 2 parts water per 100 parts polyol.

* * * * *